US009845093B2

(12) United States Patent
Yamashita et al.

(10) Patent No.: US 9,845,093 B2
(45) Date of Patent: Dec. 19, 2017

(54) VEHICLE SPEED LIMITING APPARATUS AND VEHICLE SPEED CONTROL APPARATUS

(71) Applicant: TOYOTA JIDOSHA KABUSHIKI KAISHA, Toyota-shi, Aichi-ken (JP)

(72) Inventors: Keiji Yamashita, Seto (JP); Takashi Inoue, Kasugai (JP); Tetsuya Taira, Nisshin (JP); Takato Masuda, Toyota (JP); Nobuyuki Tomatsu, Toyota (JP); Sokfan Yee, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 72 days.

(21) Appl. No.: 15/159,244

(22) Filed: May 19, 2016

(65) Prior Publication Data
US 2016/0339913 A1   Nov. 24, 2016

(30) Foreign Application Priority Data

May 22, 2015  (JP) ................................ 2015-104933

(51) Int. Cl.
*B60W 30/14* (2006.01)
*B60W 30/18* (2012.01)

(52) U.S. Cl.
CPC .... *B60W 30/146* (2013.01); *B60W 30/18163* (2013.01); *B60W 2520/10* (2013.01);
(Continued)

(58) Field of Classification Search
CPC ......... B60W 30/146; B60W 30/18163; B60W 2550/22; B60W 2510/106;
(Continued)

(56) References Cited

U.S. PATENT DOCUMENTS

| 2002/0032514 A1* | 3/2002 | Kuroda | B60K 31/0008 701/96 |
| 2004/0068393 A1* | 4/2004 | Lawrence | G08G 1/01 702/183 |

(Continued)

FOREIGN PATENT DOCUMENTS

| EP | 2803548 A1 | 11/2014 |
| JP | H07-132785 A | 5/1995 |

(Continued)

*Primary Examiner* — Mary D Cheung
(74) *Attorney, Agent, or Firm* — Oliff PLC

(57) ABSTRACT

A vehicle speed limiting apparatus includes an opening detection unit to detect an opening of an accelerator pedal of the vehicle; an estimation unit to estimate whether the vehicle starts a lane change; and an ECU to implement an upper-limit setting unit to set an upper-limit speed of the vehicle, a vehicle speed control unit to control the traveling speed so as not to exceed the upper-limit speed even when the opening of the accelerator pedal becomes great enough to make the traveling speed exceed the upper-limit speed, and a permissible speed setting unit to set a permissible speed higher than the upper-limit speed. When the estimation unit estimates that the vehicle starts the lane change, the vehicle speed control unit permits the traveling speed to exceed the upper-limit speed, and controls the traveling speed so as not to exceed the permissible speed.

10 Claims, 5 Drawing Sheets

(52) U.S. Cl.
CPC ... *B60W 2540/10* (2013.01); *B60W 2540/106* (2013.01); *B60W 2540/20* (2013.01); *B60W 2550/22* (2013.01); *B60W 2550/30* (2013.01); *B60W 2720/10* (2013.01)

(58) Field of Classification Search
CPC ......... B60W 2720/10; B60W 2540/20; B60W 2540/10; B60W 2520/10; B60W 2550/30
See application file for complete search history.

(56) References Cited

U.S. PATENT DOCUMENTS

| | | | |
|---|---|---|---|
| 2004/0236596 A1* | 11/2004 | Chowdhary | G06Q 30/0601 705/26.1 |
| 2009/0195411 A1 | 8/2009 | Ichihashi et al. | |
| 2010/0134320 A1* | 6/2010 | Chevion | G08G 1/164 340/932 |
| 2013/0085655 A1 | 4/2013 | Kii et al. | |
| 2015/0149037 A1* | 5/2015 | Lim | B60W 30/09 701/41 |

FOREIGN PATENT DOCUMENTS

| | | |
|---|---|---|
| JP | 2006-168593 A | 6/2006 |
| JP | 2008-037152 A | 2/2008 |
| JP | 2008-162553 A | 7/2008 |
| JP | 2008-298547 A | 12/2008 |
| JP | 2009-187166 A | 8/2009 |
| JP | 2009-208661 A | 9/2009 |

\* cited by examiner

VEHICLE SPEED LIMITING APPARATUS AND VEHICLE SPEED CONTROL APPARATUS

FIELD

The disclosures herein generally relate to a vehicle speed limiting apparatus and a vehicle speed control apparatus.

BACKGROUND

A technology has been known that obtains the speed limit of a place where a vehicle is traveling, and limits the traveling speed of the vehicle to be less than or equal to the obtained speed limit (see, for example, Japanese Laid-open Patent Publication No. 2006-168593).

However, by using such a conventional technology, when the driver steps on the accelerator pedal to promptly complete a lane change of the vehicle, there is a likelihood that the vehicle may not be accelerated as intended by the driver because the traveling speed of the vehicle is limited by the speed limit of the place where the vehicle is traveling.

SUMMARY

According to at least one embodiment, a vehicle speed limiting apparatus includes an opening detection unit configured to detect an opening of an accelerator pedal of the vehicle; an estimation unit configured to estimate whether the vehicle starts a lane change; and an electronic control unit configured to implement an upper-limit setting unit configured to set an upper-limit speed of the vehicle, a vehicle speed control unit configured to control the traveling speed so as not to exceed the upper-limit speed even when the opening of the accelerator pedal of the vehicle becomes great enough to make the traveling speed of the vehicle exceed the upper-limit speed, and a permissible speed setting unit configured to set a permissible speed higher than the upper-limit speed. When the estimation unit estimates that the vehicle starts the lane change, the vehicle speed control unit permits the traveling speed to exceed the upper-limit speed, and controls the traveling speed so as not to exceed the permissible speed set by the permissible speed setting unit.

DESCRIPTION OF EMBODIMENTS

In the following, embodiments will be described with reference to the drawings.

Figure 1:
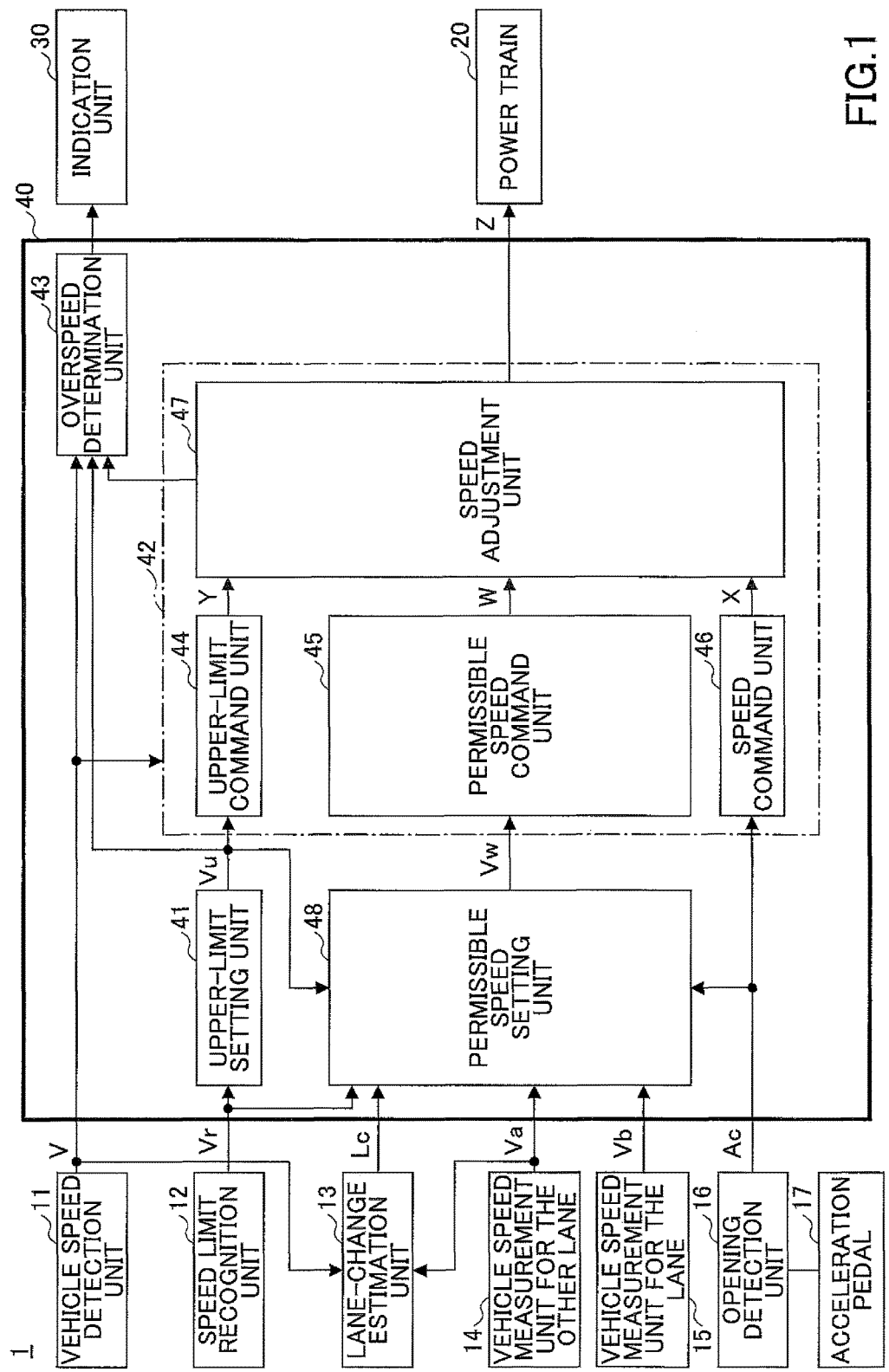
FIG. 1 is a block diagram that illustrates an example of a configuration of a vehicle speed limiting apparatus having a vehicle speed control apparatus.

FIG. 1 is a block diagram that illustrates an example of a configuration of a vehicle speed limiting apparatus 1 having a vehicle speed control apparatus 40. The vehicle speed limiting apparatus 1 is an example of an apparatus to limit the traveling speed of a vehicle so as not to exceed an upper-limit speed set depending on a recognized speed limit of a road. The vehicle speed limiting apparatus 1 includes, for example, a vehicle speed detection unit 11, a speed limit recognition unit 12, a lane-change estimation unit 13, a vehicle speed measurement unit for the other lane 14, a vehicle speed measurement unit for the lane 15, an accelerator pedal 17, an opening detection unit 16, the vehicle speed control apparatus 40, a power train 20, and an indication unit 30.

The vehicle speed detection unit 11 is an example of a sensor that detects the traveling speed V of the vehicle. As a specific example of the vehicle speed detection unit 11, a wheel speed sensor may be considered that detects the traveling speed V by monitoring rotation of a wheel.

The speed limit recognition unit 12 is an example of a unit that recognizes the speed limit Vr of the road. The speed limit recognition unit 12 includes, for example, a camera to capture an image ahead of the vehicle, and an image recognition unit to apply image recognition to a captured image obtained by the camera, for obtaining a speed limit Vr displayed on a road sign or a road marking. Alternatively, the speed limit recognition unit 12 may include, for example, a memory to store the speed limits Vr of respective roads, and an extraction unit to extract the speed limit Vr of a road where the vehicle is currently positioned from the memory (a specific example may be a car navigation device having a path search function).

The speed limit recognition unit 12 may be capable of recognizing the speed limit Vr for each lane of a road because the speed limit Vr of the road may be set for each of the lanes. In this case, the speed limit recognition unit 12 may include, for example, a memory to store the speed limits Vr of the respective lanes of the road, and an extraction unit to extract the speed limit Vr of a lane of the road where the vehicle is currently positioned from the memory. Therefore, for example, in FIG. 2, the speed limit recognition unit 12 can recognize the speed limit Vr of a lane (a lane 71 before starting a lane change, or a lane 72 after having started the lane change) of a road 70 on which a vehicle 61 is currently traveling. Also, the speed limit recognition unit 12 can recognize the speed limit Vr of the lane 72, which is the lane-change destination, before completing the lane change.

In FIG. 1, the lane-change estimation unit 13 is an example of a unit that estimates whether the vehicle is to start a lane change, and estimates whether the vehicle has completed the lane change. For an estimated period after the vehicle has started a lane change until the vehicle completes the lane change (referred to as the "estimated period Ta", below), the lane-change estimation unit 13 outputs an estimation signal Lc at an active level. The lane-change estimation unit 13 outputs the estimation signal Lc, for example, at a high level during the estimated period Ta, and outputs the estimation signal Lc at a low level during a period other than the estimated period Ta (referred to as the "the non-estimated period Tb", below). Also, the lane-change estimation unit 13 can estimate whether the lane-change destination of the vehicle is in the right direction or in the left direction.

The lane-change estimation unit 13 estimates the start and the end of a lane change of the vehicle, for example, based on a change of a signal of the blinker of the vehicle. The lane-change estimation unit 13 estimates that the vehicle is to start a lane change when detecting that the signal of the blinker is switched from off to on, and estimates that the vehicle has completed the lane change when detecting that the signal of the blinker is switched from on to off.

The lane-change estimation unit 13 may estimate the start and the end of a lane change of the vehicle, based on an extent of overlapping between the width of the vehicle and the width of the lane on which the vehicle is traveling. The lane-change estimation unit 13 estimates that the vehicle is to start a lane change when detecting that the extent of overlapping decreases to be lower than a predetermined value, and estimates that the vehicle has completed the lane change when detecting that the extent of overlapping increases to be greater than a predetermined value.

The lane-change estimation unit 13 may estimate the start and the end of a lane change of the vehicle, based on a change of the number of lanes of the road on which the vehicle is traveling.

Figure 3:
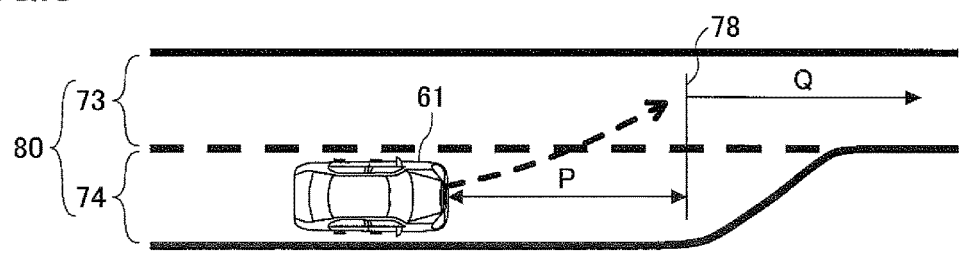
FIG. 3 is a diagram that illustrates an example of a case where a vehicle is traveling on a road whose number of lanes is reduced ahead.

For example, in FIG. 3, the lane-change estimation unit 13 estimates that the vehicle 61 is to start a lane change when detecting that a travel time or a travel distance for the vehicle 61 to reach a lane decreasing position 78 is less than or equal to a predetermined threshold P. This is because the lane-change estimation unit 13 can predict the lane change to a lane 73 by the vehicle 61 in such a case. The lane decreasing position 78 represents a position at which a lane 74 on which the vehicle 61 is currently traveling disappears due to the decreasing number of lanes of a road 80, which may include the neighborhood of the position where the lane 74 disappears. The threshold P is discretionally set to a value greater than zero.

On the other hand, the lane-change estimation unit 13 estimates that the vehicle 61 has completed the lane change to the lane 73 when detecting that the travel time or the travel distance after the vehicle 61 has passed the lane decreasing position 78 is greater than or equal to a predetermined threshold Q. The threshold Q is discretionally set to a value greater than zero.

Figure 4:
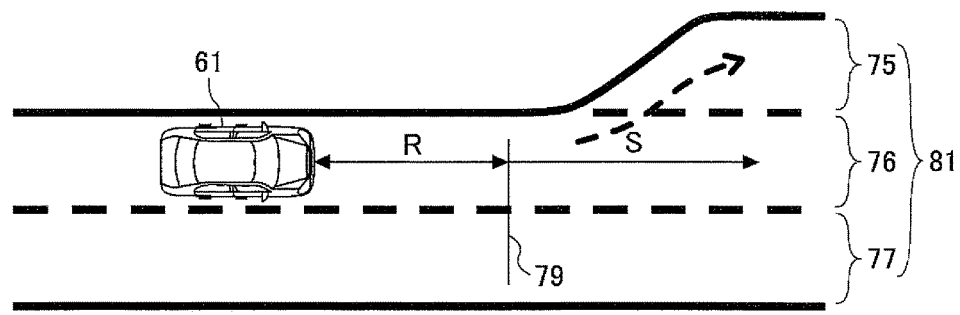
FIG. 4 is a diagram that illustrates an example of a case where a vehicle is traveling on a road whose number of lanes is increased ahead.

Also, for example, in FIG. 4, the lane-change estimation unit 13 estimates that the vehicle 61 is to start a lane change if a travel time or a travel distance for the vehicle 61 to reach a lane increasing position 79 is less than or equal to a predetermined threshold R, and the blinker of the vehicle 61 detects a signal that indicates a lane change to a lane 75, which is added at the lane increase position 79. This is because the lane-change estimation unit 13 can predict the lane change of the vehicle 61 to the lane 75 in such a case. The lane increasing position 79 represents a position at which the lane 75 is added adjacent to the lane 76 on which the vehicle 61 is currently traveling due to the increasing number of lanes of a road 81, which may include the neighborhood of the position where the lane 75 is added. The threshold R is discretionally set to a value greater than zero. The lane 75 is a passing lane having the speed limit Vr that is, for example, equivalent to or higher than those of the lanes 76 and 77.

On the other hand, the lane-change estimation unit 13 estimates that the vehicle 61 has completed the lane change if the travel time or the travel distance after the vehicle 61 has passed the lane increasing position 79 is greater than or equal to a predetermined threshold S, and detecting that the signal of the blinker of the vehicle 61 is switched from on to off. The threshold S is discretionally set to a value greater than zero.

Note that estimation methods of a lane change by the lane-change estimation unit 13 are not limited to these methods, but may be other methods. Also, to avoid an erroneous estimation of a lane change, these methods may be combined. Also, to avoid an erroneous estimation of a lane change, a lane change may be estimated by combining at least one information item among steering information, yaw rate information, captured image information by a camera, and the vehicle positional information.

In FIG. 1, the vehicle speed measurement unit for the other lane 14 is an example of a sensor to measure a traveling speed Va of another vehicle that is traveling on a lane different from the lane on which the vehicle is traveling. The vehicle speed measurement unit for the lane 15 is an example of a sensor to measure a traveling speed Vb of another vehicle that is traveling on the same lane as the lane on which the vehicle is traveling. The vehicle speed measurement unit for the other lane 14 and the vehicle speed measurement unit for the lane 15 are examples of a speed measurement unit to measure traveling speed of other vehicles. For example, in FIG. 2, when the vehicle 61 is traveling on the lane 71, the vehicle speed measurement unit 14 can measure the traveling speed Va of another vehicle 62 that is traveling on the lane 72 adjacent to the lane 71. Also, when the vehicle 61 is traveling on the lane 72, the vehicle speed measurement unit 15 can measure the traveling speed Vb of the other vehicle 62 that is traveling on the lane 72. As a specific example of the vehicle speed measurement units 14 and 15, one may consider an emission sensor that emits a radio wave to another vehicle, and measures the traveling speed of the other vehicle, or a communication apparatus that receives the traveling speed of the other vehicle by wireless communication between the vehicles or between the road and the vehicle.

In FIG. 1, the opening detection unit 16 is an example of a sensor that detects an opening Ac of the accelerator pedal 17 on which the driver performs a pedaling operation. The opening Ac is equivalent to the stepping amount of the accelerator pedal 17 on which the driver performs a pedaling operation.

The vehicle speed control apparatus 40 is an example of a unit that executes controlling (vehicle speed limit control) to limit the traveling speed V so as not to exceed an upper-limit speed set depending on the speed limit Vr of the road that has been recognized. The vehicle speed control apparatus 40 includes an upper-limit setting unit 41, a vehicle speed control unit 42, a permissible speed setting unit 48, and an overspeed determination unit 43. The vehicle speed control apparatus 40 is an electronic control unit (ECU) that includes, for example, a microcomputer implementing the upper-limit setting unit 41, the vehicle speed control unit 42, the permissible speed setting unit 48, and the overspeed determination unit 43.

The upper-limit setting unit 41 is an example of a unit that sets an upper-limit speed of the vehicle (referred to as the "the upper-limit speed Vu", below) depending on the speed limit Vr of the road that has been recognized by the speed limit recognition unit 12. The upper-limit setting unit 41 sets the upper-limit speed Vu to a value that has a difference less than a predetermined speed with the speed limit Vr. In other words, the upper-limit speed Vu may be set to the same value as the speed limit Vr, may be set to a value adding the predetermined difference value to the speed limit Vr, or may be set to a value subtracting the predetermined difference value from the speed limit Vr. For example, if a recognized speed limit Vr is 80 kph, the upper-limit setting unit 41 may set the upper-limit speed Vu to 80 kph, may set the upper-limit speed Vu to 82 kph, or may set the upper-limit speed Vu to 78 kph. Here, "kph" represents "km/h". Also, the upper-limit setting unit 41 may set the upper-limit speed Vu, which is set depending on the speed limit Vr, to a predetermined value, or to a value selected by a selection operation by the driver.

The vehicle speed control unit 42 is an example of a unit that controls the traveling speed V so as not to exceed the upper-limit speed Vu even if the opening Ac of the accelerator pedal 17 of the vehicle detected by the opening detection unit 16 becomes great enough to make the traveling speed V of the vehicle exceed the upper-limit speed Vu. The vehicle speed control unit 42 includes a speed adjustment unit 47 that outputs a control signal Z to adjust the traveling speed V.

The power train 20 is an example of a mechanism that transfers motive power generated by at least one of an engine and a motor, to the wheels of the vehicle via a transmission, following a control signal Z that is output from the speed adjustment unit 47. The power train 20 includes, for example, at least one of the engine and the motor, and the transmission. By having the power train 20 follow the control signal Z, and transfer the motive power to the wheels, the vehicle can be accelerated or decelerated.

If it is estimated by the lane-change estimation unit 13 that the vehicle starts a lane change, the vehicle speed control unit 42 permits the traveling speed V to exceed the upper-limit speed Vu. Thus, if it is estimated that the vehicle starts a lane change, since the traveling speed V is not limited to be less than or equal to the upper-limit speed Vu, the likelihood can be reduced that the vehicle cannot be accelerated when changing the lane, against the intention of the driver who increases the opening Ac of the accelerator pedal 17. Consequently, a likelihood becomes higher that the vehicle can complete the lane change promptly.

The permissible speed setting unit 48 is an example of a unit that sets a permissible speed (referred to as the "the permissible speed Vw", below) that is higher than the upper-limit speed Vu. If it is estimated by the lane-change estimation unit 13 that the vehicle starts a lane change, the vehicle speed control unit 42 controls the traveling speed V so as not to exceed the permissible speed Vw set by the permissible speed setting unit 48. Thus, the traveling speed V is limited to be less than or equal to the permissible speed Vw, and hence, even if the opening Ac of the accelerator pedal 17 becomes excessively great, the traveling speed V can be prevented from exceeding the upper-limit speed Vu too much.

The permissible speed setting unit 48 sets the permissible speed Vw depending on an increased amount of the opening Ac of the accelerator pedal 17, for example, after it has been estimated by the lane-change estimation unit 13 that the vehicle starts a lane change. Thus, the vehicle speed control unit 42 can set the permissible speed Vw to a speed value that is consistent with the driver's intention to accelerate the vehicle. The permissible speed setting unit 48 sets the speed value of the permissible speed Vw higher, for example, while the increased amount of the opening Ac becomes greater. The increased amount of the opening Ac can be detected by the opening detection unit 16.

The permissible speed setting unit 48 may set the permissible speed Vw to be greater than or equal to the speed limit Vr of the road on which the vehicle is traveling. The speed limit Vr is recognized by the speed limit recognition unit 12. Thus, the vehicle speed control unit 42 can limit the traveling speed V to be less than or equal to the permissible speed Vw that is greater than or equal to the speed limit Vr. The permissible speed setting unit 48 sets the permissible speed Vw to a speed value, for example, adding a predetermined constant speed to the speed limit Vr. For example, in FIG. 2, if the speed limit Vr is 80 kph on the road 70 and the upper-limit speed Vu is 82 kph, the permissible speed setting unit 48 sets the permissible speed Vw to 90 kph.

The speed limit recognition unit 12 recognizes the speed limit of the lane on which the vehicle is traveling, and the speed limit of the lane-change destination of the vehicle. The upper-limit setting unit 41 sets the speed limit of the lane on which the vehicle is traveling as the upper-limit speed Vu. In this case, if the speed limit of the lane-change destination of the vehicle is higher than the speed limit of the lane on which the vehicle is traveling, the permissible speed setting unit 48 sets the permissible speed Vw to a value that is greater than or equal to the speed limit of the lane-change destination of the vehicle. In other words, if the speed limit of the lane-change destination of the vehicle is higher than the speed limit of the lane on which the vehicle is traveling, the permissible speed setting unit 48 may set the permissible speed Vw to a value that is higher than the speed limit of the lane-change destination of the vehicle, or may set the permissible speed Vw to a value that is equivalent to the speed limit of the lane-change destination of the, vehicle.

Figure 2:
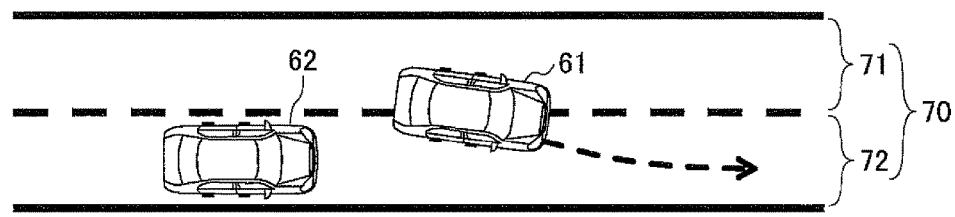
FIG. 2 is a diagram that illustrates an example of a case where a vehicle changes the lane to be ahead of another vehicle.

For example, in FIG. 2, if the speed limit Vr of the road 71 on which the vehicle 61 is traveling is 80 kph, and the speed limit Vr of the lane 72 that is the lane-change destination of the vehicle 61 is 100 kph, the permissible speed setting unit 48 sets the permissible speed Vw to 102 kph. Thus, when the driver accelerates the vehicle 61 toward the speed limit Vr of the lane 72 of the lane-change destination, the vehicle speed control unit 42 can avoid the traveling speed V of the vehicle 61 being limited to be less than or equal to the speed limit Vr of the lane 71 before the lane change.

If the speed limit Vr of the lane-change destination is lower than the speed limit Vr before the lane change, the permissible speed setting unit 48 may set the permissible speed Vw to be greater than or equal to the speed limit Vr before the lane change. For example, in FIG. 2, if the speed limit Vr of the lane 72 of the lane-change destination is 80 kph, the speed limit Vr of the lane 71 before the lane is 100 kph, and the upper-limit speed Vu is 102 kph, the permissible speed setting unit 48 sets the permissible speed Vw to 103 kph. Thus, when the driver accelerates the vehicle 61 to be faster than the speed limit Vr of the lane 72 before the lane change, the vehicle speed control unit 42 can avoid the traveling speed V of the vehicle 61 being decelerated to be less than or equal to the speed limit Vr of the lane 72 of the lane-change destination.

The permissible speed setting unit 48 sets the permissible speed Vw depending on the traveling speed of another vehicle 62 on the lane-change destination of the vehicle 61. Thus, the vehicle speed control unit 42 can secure the inter-vehicle distance between the vehicle 61 and the other vehicle 62 on the lane-change destination appropriately. The direction of the lane-change destination of the vehicle 61 is estimated by the lane-change estimation unit 13. The traveling speed of the other vehicle 62 on the lane-change destination of the vehicle 61 can be measured by the vehicle speed measurement unit for the other lane 14 before the lane change, and can be measured by the vehicle speed measurement unit for the lane 15 after the lane change.

Figure 5:
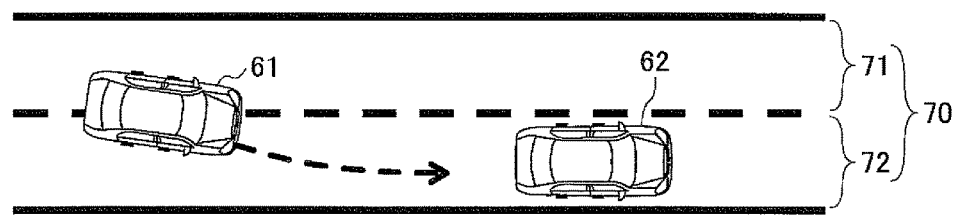
FIG. 5 is a diagram that illustrates an example of a case where a vehicle changes the lane to be behind another vehicle.

For example, the lane-change estimation unit 13 estimates whether the vehicle 61 starts a lane change ahead of another vehicle 62. Then, if the lane-change estimation unit 13 estimates that the vehicle 61 starts a lane change ahead of the other vehicle 62 as illustrated in FIG. 2, the permissible speed setting unit 48 sets the permissible speed Vw to be greater than or equal to the traveling speed of the other vehicle 62. Thus, the vehicle speed control unit 42 can prevent the other vehicle 62 behind the vehicle 61, from getting too close to the vehicle 61. On the other hand, the lane-change estimation unit 13 also estimates whether the vehicle 61 starts a lane change behind another vehicle 62. Then, if the lane-change estimation unit 13 estimates that the vehicle 61 starts a lane change behind the other vehicle 62 as illustrated in FIG. 5, and the upper-limit speed Vu is less than or equal to the traveling speed of the other vehicle 62, the permissible speed setting unit 48 sets the permissible speed Vw to be less than or equal to the traveling speed of the other vehicle 62. Thus, the vehicle speed control unit 42 can prevent the vehicle 61 behind the other vehicle 62, from getting too close to the other vehicle 62.

Note that if it is estimated by a movement direction detection unit that the vehicle moves ahead of another vehicle, the lane-change estimation unit 13 estimates that the vehicle starts a lane change ahead of the other vehicle. On the other hand, if it is estimated by the movement direction detection unit that the vehicle moves behind another vehicle, the lane-change estimation unit 13 estimates that the vehicle starts a lane change behind the other vehicle. The movement direction detection unit is a unit that detects whether the vehicle moves ahead of the other vehicle or behind the other vehicle. The movement direction detection unit can detect whether the vehicle moves ahead of the other vehicle or behind the other vehicle, for example, based on the relative position of the other vehicle with respect to the vehicle, and a relationship between the traveling speed V of the vehicle detected by the vehicle speed detection unit 11, and the traveling speed Va of the other vehicle measured by the vehicle speed measurement unit for the other lane 14. The relative position of the other vehicle with respect to the vehicle can be obtained by, for example, a camera, a radar, or inter-vehicle communication. Any other methods that detect whether the vehicle moves ahead of the other vehicle or behind the other vehicle, can be adopted of course.

In FIG. 1, the vehicle speed control unit 42 includes, for example, a speed command unit 46, an upper-limit command unit 44, a permissible speed command unit 45, and a speed adjustment unit 47.

The speed command unit 46 is an example of a unit that generates a speed command value X to control the traveling speed V depending on the opening Ac of the accelerator pedal 17 detected by the opening detection unit 16.

The upper-limit command unit 44 is an example of a unit that generates a limiting speed command value Y to control the traveling speed V to the upper-limit speed Vu set by the upper-limit setting unit 41.

The permissible speed command unit 45 is an example of a unit that generates a permissible speed command value W to control the traveling speed V to the permissible speed Vw.

In a period during which a lane change of the vehicle is not estimated by the lane-change estimation unit 13, the speed adjustment unit 47 outputs a control signal Z to adjust the traveling speed V, following a command value that is one of a speed command value X generated by the speed command unit 46 and a limiting speed command value Y generated by the upper-limit command unit 44, whichever makes the traveling speed V lower. A period during which a lane change of the vehicle is not estimated by the lane-change estimation unit 13, represents the non-estimated period Tb described above, and during the period, for example, an estimation signal Lc at the low-level is output from the lane-change estimation unit 13.

On the other hand, in a period during which a lane change of the vehicle is being estimated by the lane-change estimation unit 13, the speed adjustment unit 47 outputs a control signal Z to adjust the traveling speed V, following a command value that is one of a speed command value X generated by the speed command unit 46 and a permissible speed command value W generated by the permissible speed command unit 45, whichever makes the traveling speed V lower. A period during which a lane change of the vehicle is being estimated by the lane-change estimation unit 13, represents the estimated period Ta described above, and during the period, for example, an estimation signal Lc at the high-level is output from the lane-change estimation unit 13.

For example, if the command value to make the traveling speed V lower is the speed command value X in the non-estimated period Tb or the estimated period Ta, the speed adjustment unit 47 outputs a control signal Z to adjust the traveling speed V following the speed command value X. If the command value to make the traveling speed V lower is the speed command value X, the speed determined depending on the opening Ac of the accelerator pedal 17 (referred to as the the "speed Vo corresponding to the accelerator opening", below) is lower than the upper-limit speed Vu. Therefore, if the command value to make the traveling speed V lower is the speed command value X, the speed adjustment unit 47 can adjust the traveling speed V to the speed Vo corresponding to the accelerator opening, by adjusting the traveling speed V following the speed command value X, within a speed range lower than the upper-limit speed Vu and without being limited by the upper-limit speed Vu.

On the other hand, if the command value to make the traveling speed V lower is the limiting speed command value Y in the non-estimated period Tb, the speed adjustment unit 47 outputs a control signal Z to adjust the traveling speed V following the limiting speed command value Y. If the command value to make the traveling speed V lower is the limiting speed command value Y, the speed Vo corresponding to the accelerator opening is higher than the upper-limit speed Vu. Therefore, if the command value to make the traveling speed V lower is the limiting speed command value Y in the non-estimated period Tb, the speed adjustment unit 47 adjusts the traveling speed V following the limiting speed command value Y, to maintain the traveling speed V limited by the upper-limit speed Vu.

On the other hand, if the command value to make the traveling speed V lower is the permissible speed command value W in the estimated period Ta, the speed adjustment unit 47 outputs a control signal Z to adjust the traveling speed V following the permissible speed command value W. If the command value to make the traveling speed V lower is the permissible speed command value W, the speed Vo corresponding to the accelerator opening is higher than the permissible speed Vw. Therefore, if the command value to make the traveling speed V lower is the permissible speed command value W in the estimated period Ta, the speed adjustment unit 47 adjusts the traveling speed V following the permissible speed command value W, to maintain the traveling speed V limited by the permissible speed Vw.

On the other hand, if the same traveling speed V is to be obtained by either of the speed command value X or the limiting speed command value Y in the non-estimated period Tb, the speed adjustment unit 47 outputs a control signal Z to adjust the traveling speed V following a predetermined one of the command values of the speed command value X and the limiting speed command value Y. If the same traveling speed V is to be obtained by either of the speed command value X or the limiting speed command value Y, the speed Vo corresponding to the accelerator opening is equivalent to the upper-limit speed Vu. Therefore, if the same traveling speed V is to be obtained by either of the speed command value X or the limiting speed command value Y in the non-estimated period Tb, the speed adjustment unit 47 adjusts the traveling speed V following the predetermined one of the command values of the speed command value X and the limiting speed command value Y, to maintain the traveling speed V limited by the upper-limit speed Vu.

On the other hand, if the same traveling speed V is to be obtained by either of the speed command value X or the permissible speed command value W in the estimated period Ta, the speed adjustment unit 47 outputs a control signal Z to adjust the traveling speed V following a predetermined one of the command values of the speed command value X and the permissible speed command value W. If the same traveling speed V is to be obtained by either of the speed command value X or the permissible speed command value W, the speed Vo corresponding to the accelerator opening is equivalent to the permissible speed Vw. Therefore, if the same traveling speed V is obtained by either of the speed command value X or the permissible speed command value W in the non-estimated period Tb, the speed adjustment unit 47 adjusts the traveling speed V following the predetermined one of the command values of the speed command value X and the permissible speed command value W, to maintain the traveling speed V limited by the permissible speed Vw.

Also, for example, the speed command value X is a value to control the traveling speed V to be target speed Vt that corresponds to the opening Ac. In this case, the speed adjustment unit 47 compares the target speed Vt with the upper-limit speed Vu in the non-estimated period Tb, and if the target speed Vt is less than the upper-limit speed Vu, adjusts the traveling speed V following the speed command value X, or if the target speed Vt is greater than or equal to the upper-limit speed Vu, adjusts the traveling speed V following the limiting speed command value Y. On the other hand, the speed adjustment unit 47 compares the target speed Vt with the permissible speed Vw in the estimated period Ta, and if the target speed Vt is less than the permissible speed Vw, adjusts the traveling speed V following the speed command value X, or if the target speed Vt is greater than or equal to the permissible speed Vw, adjusts the traveling speed V following the permissible speed command value W.

For example, the speed command value X may be a value to command target acceleration At to control the traveling speed V, the limiting speed command value Y may be a value to command limiting acceleration Ar to control the traveling speed V to the upper-limit speed Vu, and the permissible speed command value W may be a value to command permissible acceleration Aw to control the traveling speed V to the permissible speed Vw. In this case, the speed adjustment unit 47 compares the target acceleration At with the limiting acceleration Ar in the non-estimated period Tb, and if the target acceleration At is less than the limiting acceleration Ar, adjusts the traveling speed V following the speed command value X, or if the target acceleration At is greater than or equal to the limiting acceleration Ar, adjusts the traveling speed V following the limiting speed command value Y. On the other hand, the speed adjustment unit 47 compares the target acceleration At with the permissible acceleration Aw in the estimated period Ta, and if the target acceleration At is less than the permissible acceleration Aw, adjusts the traveling speed V following the speed command value X, or if the target acceleration At is greater than or equal to the permissible acceleration Aw, adjusts the traveling speed V following the permissible speed command value W. The target acceleration At, the limiting acceleration Ar and the permissible acceleration Aw represent acceleration values of the vehicle itself.

For example, the speed command value X may be a value to command target driving force Dt to control the traveling speed V, the limiting speed command value Y may be a value to command limiting driving force Dr to control the traveling speed V to the upper-limit speed Vu, and the permissible speed command value W may be a value to command permissible driving force Dw to control the traveling speed V to the permissible speed Vw. In this case, the speed adjustment unit 47 compares the target driving force Dt with the limiting driving force Dr in the non-estimated period Tb, and if the target driving force Dt is less than the limiting driving force Dr, adjusts the traveling speed V following the speed command value X, or if the target driving force Dt is greater than or equal to the limiting driving force Dr, adjusts the traveling speed V following the limiting speed command value Y. On the other hand, the speed adjustment unit 47 compares the target driving force Dt with the permissible driving force Dw in the estimated period Ta, and if the target driving force Dt is less than the permissible driving force Dw, adjusts the traveling speed V following the speed command value X, or if the target driving force Dt is greater than or equal to the permissible driving force Dw, adjusts the traveling speed V following the permissible speed command value W. The target driving force Dt, the limiting driving force Dr and the permissible driving force Dw represent driving force values of the vehicle itself.

For example, the speed command value X may be a value to command target throttle opening St to control the traveling speed V, the limiting speed command value Y may be a value to command limiting throttle opening Sr to control the traveling speed V to the upper-limit speed Vu, and the permissible speed command value W may be a value to command permissible throttle opening Sw to control the traveling speed V to the permissible speed Vw. In this case, the speed adjustment unit 47 compares the target throttle opening St with the limiting throttle opening Sr in the non-estimated period Tb, and if the target throttle opening St is less than the limiting throttle opening Sr, adjusts the traveling speed V following the speed command value X, or if the target throttle opening St is greater than or equal to the limiting throttle opening Sr, adjusts the traveling speed V following the limiting speed command value Y. On the other hand, the speed adjustment unit 47 compares the target throttle opening St with the permissible throttle opening Sw in the estimated period Ta, and if the target throttle opening St is less than the permissible throttle opening Sw, adjusts the traveling speed V following the speed command value X, or if the target throttle opening St is greater than or equal to the permissible throttle opening Sw, adjusts the traveling speed V following the permissible speed command value W. The target throttle opening St, the limiting throttle opening Sr and the permissible throttle opening Sw represent throttle opening values of the vehicle itself.

For example, the speed command value X may be a value to command target engine rotational speed Rt to control the traveling speed V, the limiting speed command value Y may be a value to command limiting engine rotational speed Rr to control the traveling speed V to the upper-limit speed Vu, and the permissible speed command value W may be a value to command permissible engine rotational speed Rw to control the traveling speed V to the permissible speed Vw. In this case, the speed adjustment unit 47 compares the target engine rotational speed Rt with the limiting engine rotational speed Rr in the non-estimated period Tb, and if the target engine rotational speed Rt is less than the limiting engine rotational speed Rr, adjusts the traveling speed V following the speed command value X, or if the target engine rotational speed Rt is greater than or equal to the limiting engine rotational speed Rr, adjusts the traveling speed V following the limiting speed command value Y. On the other hand, the speed adjustment unit 47 compares the target engine rotational speed Rt with the permissible engine rotational speed Rw in the estimated period Ta, and if the target engine rotational speed Rt is less than the permissible engine rotational speed Rw, adjusts the traveling speed V following the speed command value X, or if the target engine rotational speed Rt is greater than or equal to the permissible engine rotational speed Rw, adjusts the traveling speed V following the permissible speed command value W. The target engine rotational speed Rt, the limiting engine rotational speed Rr and the permissible engine rotational speed Rw represent engine rotational speed values of the vehicle itself.

Figure 6:
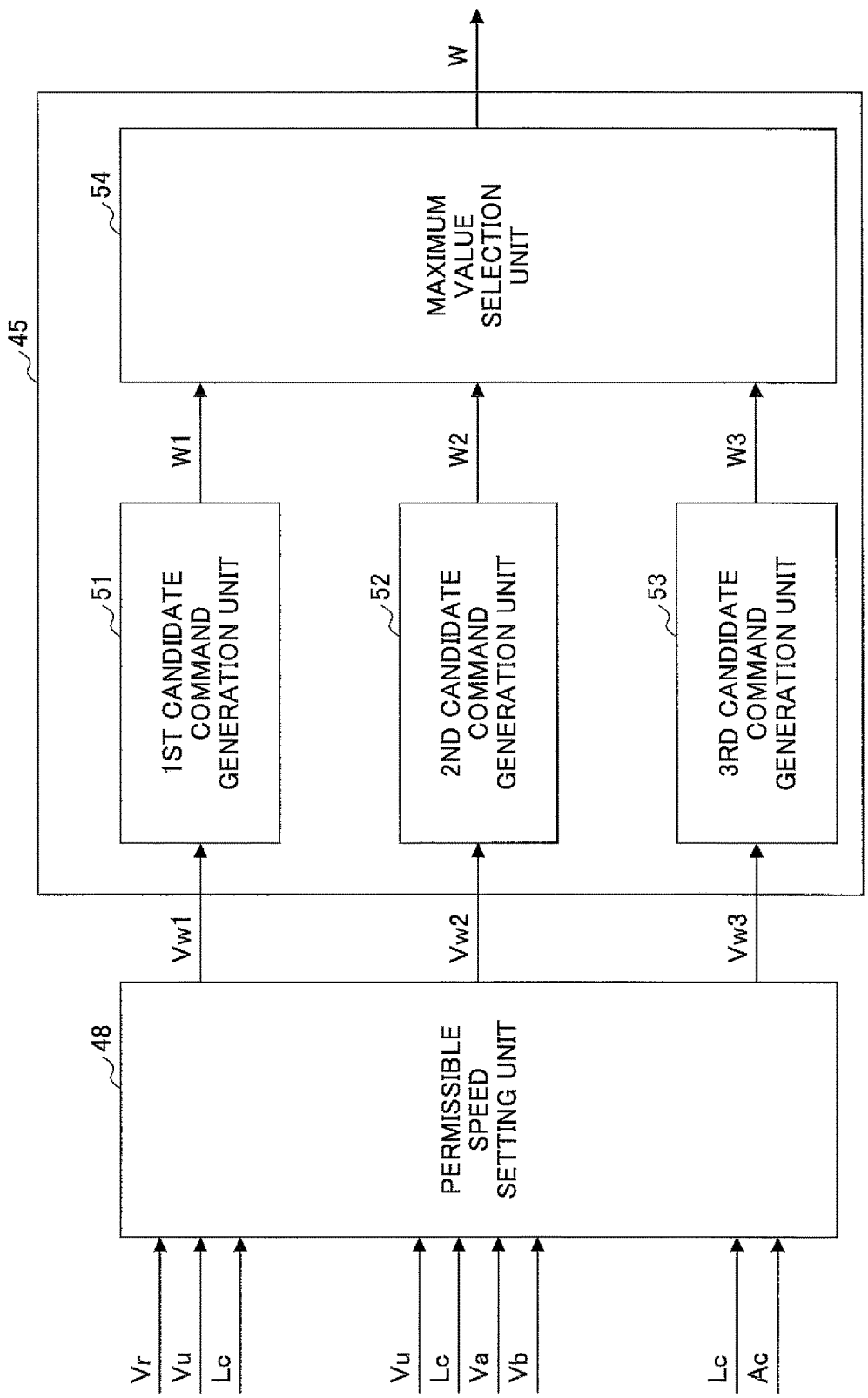
FIG. 6 is a block diagram that illustrates an example of a configuration of a permissible speed command unit.

FIG. 6 is a block diagram that illustrates an example of a configuration of the permissible speed command unit 45. The permissible speed command unit 45 includes multiple candidate command generation units that generate respective candidates of the permissible speed command value W based on respective requirements to determine the permissible speed Vw, and a maximum value selection unit that determines a final permissible speed command value W among the candidates with which the highest permissible speed Vw is obtained. Configured in this way, the permissible speed command unit 45 can select a permissible speed command value W with which the traveling speed V can be controlled to a highest speed value as the permissible speed Vw. FIG. 6 illustrates candidate command generation units 51, 52, and 53, and a maximum value selection unit 54, as examples.

The first candidate command generation unit 51 is an example of a unit that generates a permissible speed command value W1 to control the traveling speed V to a permissible speed Vw1 set by the permissible speed setting unit 48 to be higher than the upper-limit speed Vu depending on the speed limit Vr of the road on which the vehicle is traveling. The permissible speed Vw1 is one of the candidates of the permissible speed Vw, and the permissible speed command value W1 is one of the candidates of the permissible speed command value W. The first candidate command generation unit 51 generates the permissible speed command value W1 to control the traveling speed V to the permissible speed Vw1, for example, adding predetermined constant speed to the speed limit Vr in the estimated period Ta.

The second candidate command generation unit 52 is an example of a unit that generates a permissible speed command value W2 to control the traveling speed V to a permissible speed Vw2 set by the permissible speed setting unit 48 depending on the traveling speed of the other vehicle on the lane-change destination of the vehicle. The permissible speed Vw2 is one of the candidates of the permissible speed Vw, and the permissible speed command value W2 is one of the candidates of the permissible speed command value W. The second candidate command generation unit 52 generates the permissible speed command value W2 to control the traveling speed V to the permissible speed Vw2, for example, in the estimated period Ta. Also, for example, the permissible speed setting unit 48 may set the permissible speed Vw2 to speed adding predetermined constant speed to the traveling speed of the other vehicle when making a lane change ahead of the other vehicle, and may set the permissible speed Vw2 to speed subtracting predetermined constant speed from the traveling speed of the other vehicle when making a lane change behind the other vehicle.

The third candidate command generation unit 53 is an example of a unit that generates a permissible speed command value W3 to control the traveling speed V to a permissible speed Vw3 set by the permissible speed setting unit 48 depending on an increased amount of the opening Ac of the accelerator pedal 17 after the lane-change estimation unit 13 has estimated that the vehicle starts a lane change. The permissible speed Vw3 is one of the candidates of the permissible speed Vw, and the permissible speed command value W3 is one of the candidates of the permissible speed command value W. The third candidate command generation unit 53 generates the permissible speed command value W3 to control the traveling speed V to the permissible speed Vw3 whose magnitude depends on the increased amount of the opening Ac, for example, in the estimated period Ta.

The maximum value selection unit 54 determines a final permissible speed command value W among the candidates of the permissible speed command values W1, W2, and W3 that makes the permissible speed Vw the highest.

In FIG. 1, the speed adjustment unit 47 of the vehicle speed control unit 42 transmits to the overspeed determination unit 43 that the speed adjustment unit 47 permits the traveling speed V to exceed the upper-limit speed Vu. If receiving that the speed adjustment unit 47 permits the traveling speed V to exceed the upper-limit speed Vu, the overspeed determination unit 43 determines whether the current traveling speed V actually exceeds the upper-limit speed Vu. If determining that the current traveling speed V exceeds the upper-limit speed Vu, the overspeed determination unit 43 has the indication unit 30 indicate to the driver that the current traveling speed V exceeds the upper-limit speed Vu (which may be the speed limit Vr). Thus, it is possible to indicate to the driver that the upper-limit speed Vu or the speed limit Vr is exceeded. To make it possible for the driver to recognize the exceeding of the upper-limit speed Vu or the speed limit Vr, the indication unit 30 warns the driver of the exceeding of the upper-limit speed Vu or the speed limit Vr, by at least one of, for example, a display, a sound, and vibration.

Figure 7:
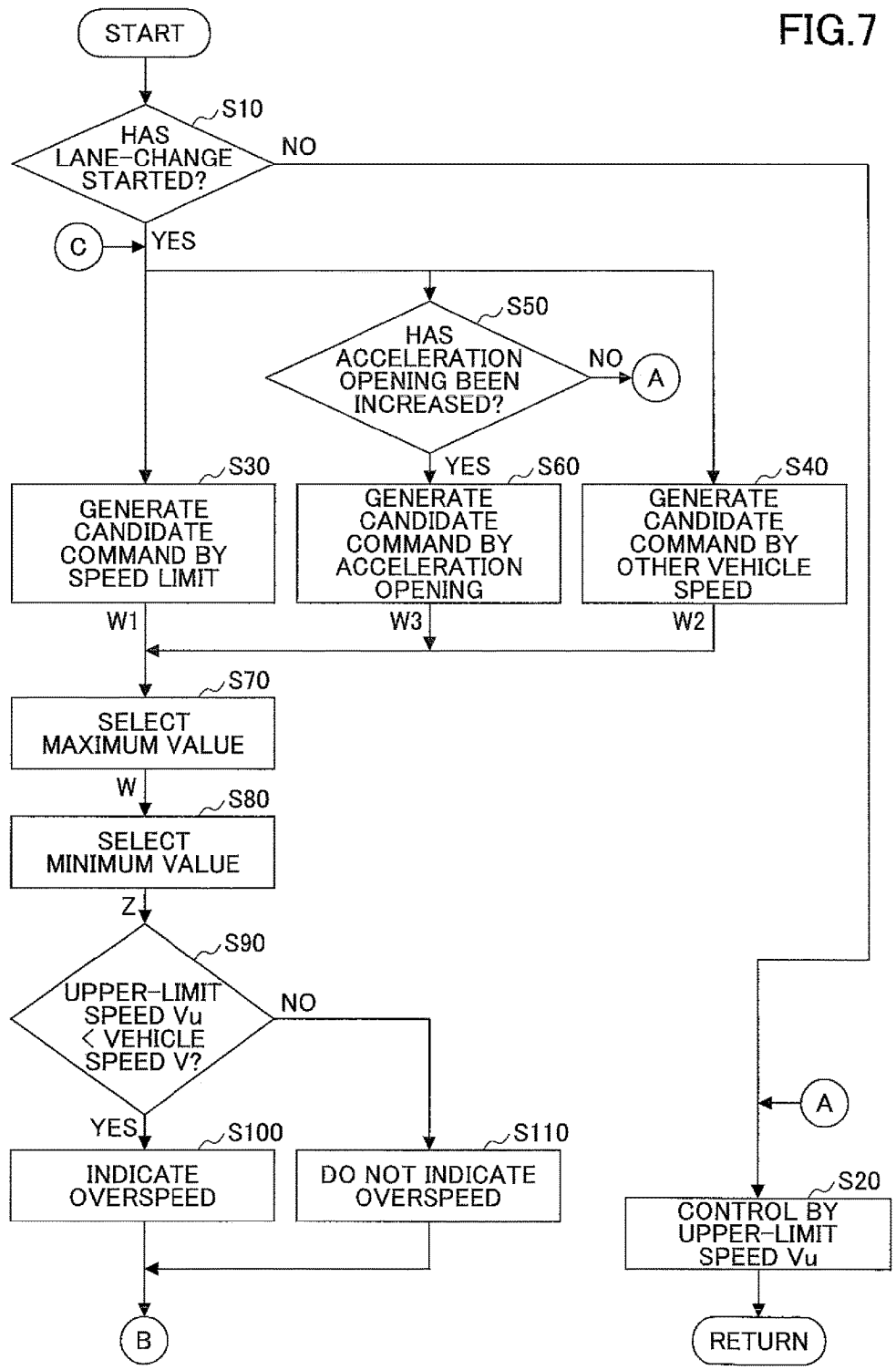
FIG. 7 is a flowchart that illustrates an example of operations of a vehicle speed control apparatus.
Figure 8:
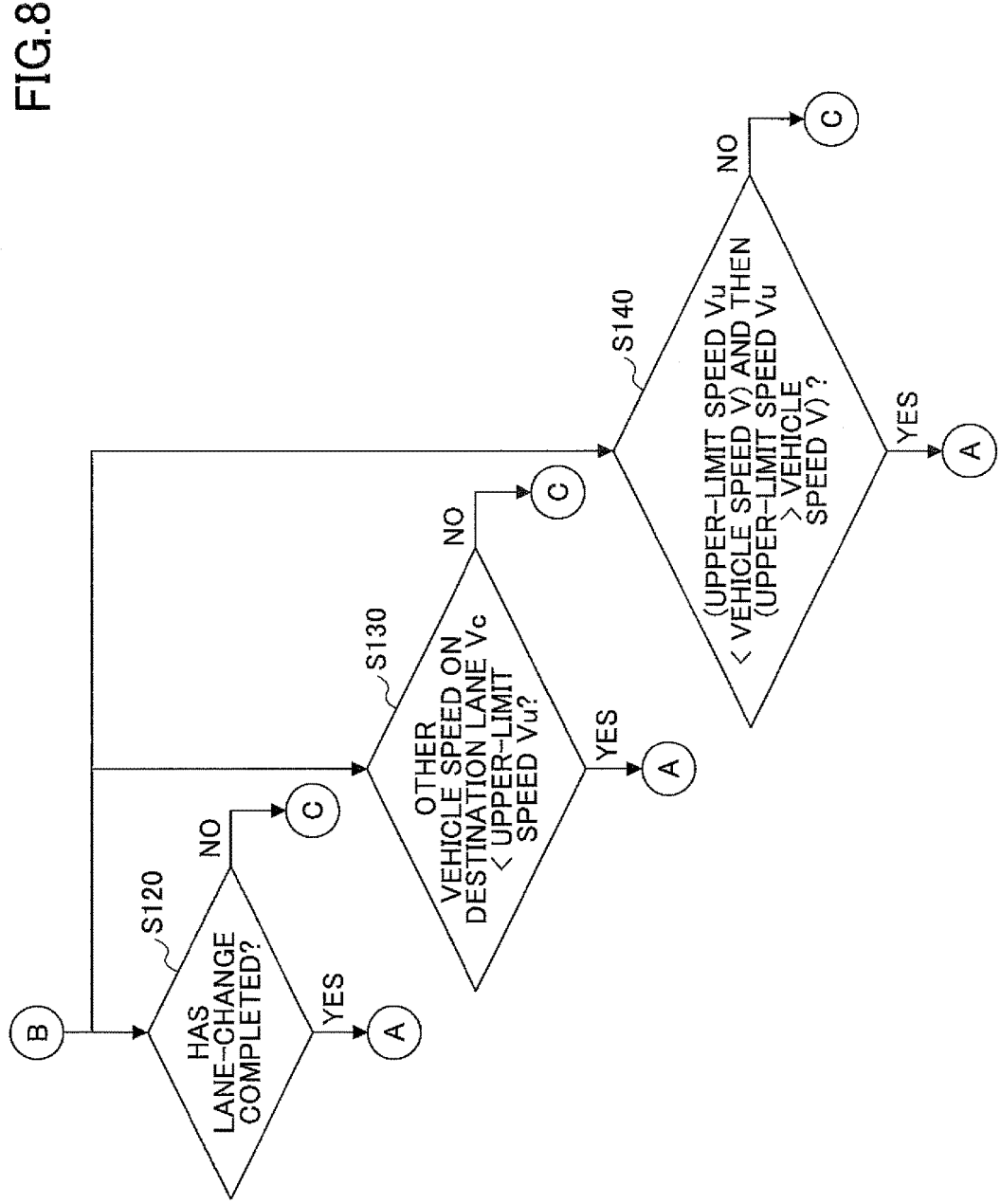
FIG. 8 is a flowchart that illustrates an example of operations of a vehicle speed control apparatus.

FIGS. 7 and 8 constitute a flowchart that illustrates an example of operations of the vehicle speed control apparatus 40 having the configuration of FIG. 6. The vehicle speed control apparatus 40 repeatedly executes a process of a vehicle speed limit method represented by this flowchart, by predetermined cycles.

At Step S10, the vehicle speed control unit 42 determines whether the lane-change estimation unit 13 has estimated that the vehicle has started a lane change.

If determining at Step S10 that the lane-change estimation unit 13 has not estimated that the vehicle has started a lane change, the vehicle speed control unit 42 executes Step S20. At Step S20, the vehicle speed control unit 42 controls the traveling speed V so as not to exceed the upper-limit speed Vu even if the opening Ac of the accelerator pedal 17 becomes great enough to make the traveling speed V exceed the upper-limit speed Vu. Having executed Step S20, the vehicle speed control unit 42 executes Step S10 again.

On the other hand, if determining at Step S10 that the lane-change estimation unit 13 has estimated that the vehicle has started a lane change, the vehicle speed control unit 42 executes Steps S30, S40, and S50 in parallel.

At Step S30, the first candidate command generation unit 51 generates a permissible speed command value W1 to control the traveling speed V to the permissible speed Vw1 set to be greater than or equal to the speed limit Vr of the road on which the vehicle is traveling.

At Step S40, the second candidate command generation unit 52 generates a permissible speed command value W2 to control the traveling speed V to the permissible speed Vw2 set depending on the traveling speed of the other vehicle on the lane-change destination of the vehicle.

At Step S50, the vehicle speed control unit 42 determines whether the opening Ac of the accelerator pedal 17 has been increased (namely, stepping has been increased on the accelerator pedal 17) after the timing when the lane-change estimation unit 13 has estimated that the vehicle has started the lane change. If determining at Step S50 that the opening Ac of the accelerator pedal 17 has not been increased, the vehicle speed control unit 42 controls the traveling speed V so as not to exceed the upper-limit speed Vu (Step S20). On the other hand, if determining at Step S50 that the opening Ac of the accelerator pedal 17 has been increased, the vehicle speed control unit 42 has the third candidate command generation unit 53 generate a permissible speed command value W3 to control the traveling speed V to the permissible speed Vw3 set depending on the increased amount of the opening Ac of the accelerator pedal 17 (Step S60).

At Step S70, the maximum value selection unit 54 determines a final permissible speed command value W among the permissible speed command values W1, W2, and W3 that makes the permissible speed Vw the highest.

At Step S80, the speed adjustment unit 47 outputs a control signal Z to adjust the traveling speed V following a command value that is one of the speed command value X generated by the speed command unit 46 and a permissible speed command value W generated by the maximum value selection unit 54 of the permissible speed command unit 45, whichever makes the traveling speed V the lowest. Here, although the command value that makes the traveling speed V the lowest represents one of the speed command value X and the permissible speed command value W, if the same traveling speed V is to be obtained by either the speed command value X or the permissible speed command value W, the command value represents the predetermined one of the speed command value X and the permissible speed command value W.

At Step S90, the overspeed determination unit 43 determines whether the traveling speed V of the vehicle exceeds the upper-limit speed Vu. If determining that the traveling speed V of the vehicle exceeds the upper-limit speed Vu, the overspeed determination unit 43 has the indication unit 30 indicate to the driver the exceeding of the upper-limit speed Vu (which may be the speed limit Vr) (Step S100). On the other hand, if determining that the traveling speed V of the vehicle does not exceed the upper-limit speed Vu, the overspeed determination unit 43 does not indicate to the driver exceeding of the upper-limit speed Vu or the speed limit Vr (Step S110). Note that Steps S90, S100, and S110 may be skipped.

Instead, having executed Step S80, the vehicle speed control unit 42 may execute Steps S120, S130, and S140 in parallel.

If one of determination conditions at Steps S120, S130, and S140 is satisfied, the vehicle speed control unit 42 determines that the necessity is reduced to permit exceeding the upper-limit speed Vu, stops permitting to exceed the upper-limit speed Vu, and executes Step S20. On the other hand, if none of the determination conditions at Steps S120, S130, and S140 is satisfied, the vehicle speed control unit 42 determines that the necessity is not reduced to permit exceeding the upper-limit speed V, continues to permit exceeding the upper-limit speed Vu, and executes Steps S30, S40, and S50 in parallel.

At Step S120, the vehicle speed control unit 42 determines whether the lane-change estimation unit 13 has estimated that the vehicle has completed the lane change. If determining that the lane-change estimation unit 13 has estimated that the vehicle has completed the lane change, the vehicle speed control unit 42 stops permitting to exceed the upper-limit speed Vu, and controls the traveling speed V so as not to exceed the upper-limit speed Vu (Step S20).

At Step S130, if the vehicle is making a lane change ahead of the other vehicle, the vehicle speed control unit 42 determines whether the traveling speed Vc of the other vehicle on the lane-change destination of the vehicle is lower than the upper-limit speed Vu. The traveling speed Vc of the other vehicle on the lane-change destination of the vehicle can be measured by the vehicle speed measurement unit for the other lane 14 before the lane change, and can be measured by the vehicle speed measurement unit for the lane 15 after the lane change. If determining that the traveling speed Vc is lower than the upper-limit speed Vu, the vehicle speed control unit 42 stops permitting to exceed the upper-limit speed Vu, and controls the traveling speed V so as not to exceed the upper-limit speed Vu (Step S20).

At Step S140, the vehicle speed control unit 42 determines whether the traveling speed V of the vehicle is reduced to be lower than the upper-limit speed Vu since the traveling speed V of the vehicle has exceeded the upper-limit speed Vu. If determining that the traveling speed V of the vehicle is reduced to be lower than the upper-limit speed Vu since the traveling speed V of the vehicle has exceeded the upper-limit speed Vu, the vehicle speed control unit 42 stops permitting to exceed the upper-limit speed Vu, and controls the traveling speed V so as not to exceed the upper-limit speed Vu (Step S20).

The embodiments have been described in detail. Note that the preferred embodiments are not limited to the above, but various modifications and improvements can be made by combining and/or replacing a part of or all of the embodiments with the others.

For example, the upper-limit setting unit 41 may not be limited to be a unit that sets the upper-limit speed Vu automatically depending on the speed limit Vr of the road recognized by the speed limit recognition unit 12, but may be a unit that sets the upper-limit speed Vu manually to a value discretionally selected by the driver by a selection operation or the like.

The present application is based on and claims the benefit of priority of Japanese Priority Application No. 2015-104933, filed on May 22, 2015, the entire contents of which are hereby incorporated by reference.

The invention claimed is:

1. A vehicle speed limiting apparatus, comprising:
an opening detection unit configured to detect an opening of an accelerator pedal of the vehicle;
an estimation unit configured to estimate whether the vehicle starts a lane change; and
an electronic control unit configured to implement an upper-limit setting unit configured to set an upper-limit speed of the vehicle, a vehicle speed control unit configured to control the traveling speed so as not to exceed the upper-limit speed even when the opening of the accelerator pedal of the vehicle becomes great enough to make the traveling speed of the vehicle exceed the upper-limit speed, and a permissible speed setting unit configured to set a permissible speed higher than the upper-limit speed, wherein when the estimation unit estimates that the vehicle starts the lane change, the vehicle speed control unit permits the traveling speed to exceed the upper-limit speed, and controls the traveling speed so as not to exceed the permissible speed set by the permissible speed setting unit.

2. The vehicle speed limiting apparatus as claimed in claim 1, wherein the permissible speed setting unit sets the permissible speed depending on an increased amount of the opening of the accelerator pedal after the estimation unit has estimated that the vehicle has started the lane change.

3. The vehicle speed limiting apparatus as claimed in claim 1, further comprising:

a speed limit recognition unit configured to recognize a speed limit of a road on which the vehicle is traveling, wherein the permissible speed setting unit sets the permissible speed to be greater than or equal to the speed limit of the road on which the vehicle is traveling.

4. The vehicle speed limiting apparatus as claimed in claim 3, wherein the speed limit recognition unit recognizes the speed limit of the lane on which the vehicle is traveling and the speed limit of the lane-change destination of the vehicle, wherein the upper-limit setting unit sets the speed limit of the lane on which the vehicle is traveling as the upper-limit speed, wherein when the speed limit of the lane-change destination of the vehicle is higher than the speed limit of the lane on which the vehicle is traveling, the permissible speed setting unit sets the permissible speed to a value greater than or equal to the speed limit of the lane-change destination of the vehicle.

5. The vehicle speed limiting apparatus as claimed in claim 1, further comprising:

a speed measurement unit configured to measure traveling speed of another vehicle, wherein the permissible speed setting unit sets the permissible speed depending on the traveling speed of the other vehicle on the lane-change destination of the vehicle.

6. The vehicle speed limiting apparatus as claimed in claim 5, wherein the estimation unit estimates whether the vehicle starts the lane change ahead of the other vehicle, wherein the permissible speed setting unit sets the permissible speed to be greater than or equal to the traveling speed of the other vehicle when the estimation unit estimates that the vehicle starts the lane change ahead of the other vehicle.

7. The vehicle speed limiting apparatus as claimed in claim 5, wherein the estimation unit estimates whether the vehicle starts the lane change behind the other vehicle, wherein the permissible speed setting unit sets the permissible speed to be less than or equal to the traveling speed of the other vehicle when the estimation unit estimates that the vehicle starts the lane change behind the other vehicle and the upper-limit speed is less than or equal to the traveling speed of the other vehicle.

8. The vehicle speed limiting apparatus as claimed in claim 1, wherein the vehicle speed control unit includes a speed command unit configured to generate a speed command value to control the traveling speed depending on the opening of the accelerator pedal, a permissible speed command unit configured to generate a permissible speed command value to control the traveling speed to be the permissible speed, and a speed adjustment unit configured to adjust the traveling speed following a command value among the speed command value and the permissible speed command value, whichever makes the traveling speed lower.

9. The vehicle speed limiting apparatus as claimed in claim 8, wherein the permissible speed command unit generates a plurality of candidates of the permissible speed command value, based on respective requirements to determine the permissible speed, and determines the permissible speed command value to be one of the candidates that makes the permissible speed a highest.

10. A vehicle speed control apparatus, comprising:

an electronic control unit configured to implement an upper-limit setting unit configured to set an upper-limit speed of the vehicle, a vehicle speed control unit configured to control the traveling speed so as not to exceed the upper-limit speed even when an opening of an accelerator pedal of the vehicle becomes great enough to make the traveling speed of the vehicle exceed the upper-limit speed, and a permissible speed setting unit configured to set a permissible speed higher than the upper-limit speed, wherein when it is estimated that the vehicle starts a lane change, the vehicle speed control unit permits the traveling speed to exceed the upper-limit speed, and controls the traveling speed so as not to exceed the permissible speed set by the permissible speed setting unit.

* * * * *